(12) United States Patent
Chang

(10) Patent No.: US 7,417,811 B2
(45) Date of Patent: Aug. 26, 2008

(54) LENS MODULE

(75) Inventor: Jen-Tsorng Chang, Taipei Hsien (TW)

(73) Assignee: Hon Hai Precision Indsutry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/777,171

(22) Filed: Jul. 12, 2007

(65) Prior Publication Data

US 2008/0117533 A1    May 22, 2008

(30) Foreign Application Priority Data

Nov. 17, 2006  (TW) ................................ 095142679

(51) Int. Cl.
*G02B 7/02* (2006.01)

(52) U.S. Cl. ........................................ 359/824; 359/823

(58) Field of Classification Search .................. 359/824, 359/823

See application file for complete search history.

(56) References Cited

U.S. PATENT DOCUMENTS

2007/0133973 A1   6/2007  Nishikawa

2007/0154198 A1*  7/2007  Oh et al. ........................ 396/85
2007/0274699 A1* 11/2007  Chuang et al. ............... 396/133

\* cited by examiner

*Primary Examiner*—Jordan M. Schwartz
*Assistant Examiner*—James C Jones

(57) ABSTRACT

A lens module includes at least one lens, a lens barrel receiving the lens, and one or more lens barrel driving assemblies. The lens barrel driving assemblies each include: a magnetic block, the lens barrel being fixedly attached to the magnetic block, the magnetic block being oriented in a manner such that a magnetization direction thereof being parallel to an optical axis of the lens; two elastic members each having first and second ends, the first ends being attached to opposite ends of the magnetic block, the second ends being secured to the frame such that the magnetic block is suspended and movable in the frame in the magnetization direction thereof; a frame receiving the elastic members and the magnetic block therein; and first and second magnetic generators configured for generating a magnetic field for driving the magnetic block with the lens barrel such that moving the lens.

6 Claims, 2 Drawing Sheets

LENS MODULE

BACKGROUND

1. Technical Field

The present invention relates to lens modules, and particularly to a lens module with an auto focus mechanism.

2. Description of Related Art

With the ongoing development of microcircuitry and multimedia technology, camera modules, including, e.g., still camera modules and digital camera modules are now in widespread use and are being combined with various electronic devices. Such camera modules need to be cheap and to have excellent optical characteristics.

A camera module of the related art includes at least one lens module and an image sensor module in alignment with the at least one lens module. The at least one lens module typically includes a lens barrel and lenses assembled in the lens barrel. Recently, lens modules have begun to integrate auto focus mechanisms, such as step motors for driving the lenses to move relative to the image sensor module, thereby achieving the auto focus function. However, the step motor is relatively bulky in volume. In addition, the step motor consumes a substantial amount of power, especially relative to the amount of power that can be stored in a typical battery system of a camera or an electronic device.

What is needed, therefore, is a lens module which has a simple and energy-efficient auto focus mechanism.

SUMMARY

In a preferred embodiment, an exemplary lens module includes at least one lens defining a principal optical axis, a lens barrel receiving the at least one lens therein, and at least one lens barrel driving assembly. Wherein the at least one lens barrel driving assembly includes a magnetic block, two elastic members, a frame receiving the elastic members and the magnetic block therein, and first and second magnetic generators. The lens barrel is fixedly attached to the magnetic block, the magnetic block is oriented in a manner such that a magnetization direction (i.e., north-south axis) thereof is substantially parallel to the principal optical axis of the at least one lens. The two elastic members each have a first end and an opposite second end, the first ends thereof are attached to opposite ends of the magnetic block, the second ends thereof are secured to the frame in a manner such that the magnetic block is suspended and movable in the frame in the magnetization direction thereof. The first and second magnetic generators are arranged adjacent to the frame and at opposite sides of the magnetic block and configured for generating a magnetic field for driving the magnetic block jointly with the lens barrel to move in a direction along the principal optical axis of the at least one lens.

Other advantages and novel features of the present invention will become more apparent from the following detailed description of preferred embodiment when taken in conjunction with the accompanying drawings.

BRIEF DESCRIPTION OF THE DRAWINGS

Many aspects of the lens module can be better understood with reference to the following drawings. The components in the drawing are not necessarily drawn to scale, the emphasis instead being placed upon clearly illustrating the principles of the present lens module. Moreover, in the drawings, like reference numerals designate corresponding parts throughout the several views.

DETAILED DESCRIPTION OF THE PREFERRED EMBODIMENTS

Embodiments of the present lens module will now be described in detail below and with reference to the drawings.

Figure 1:
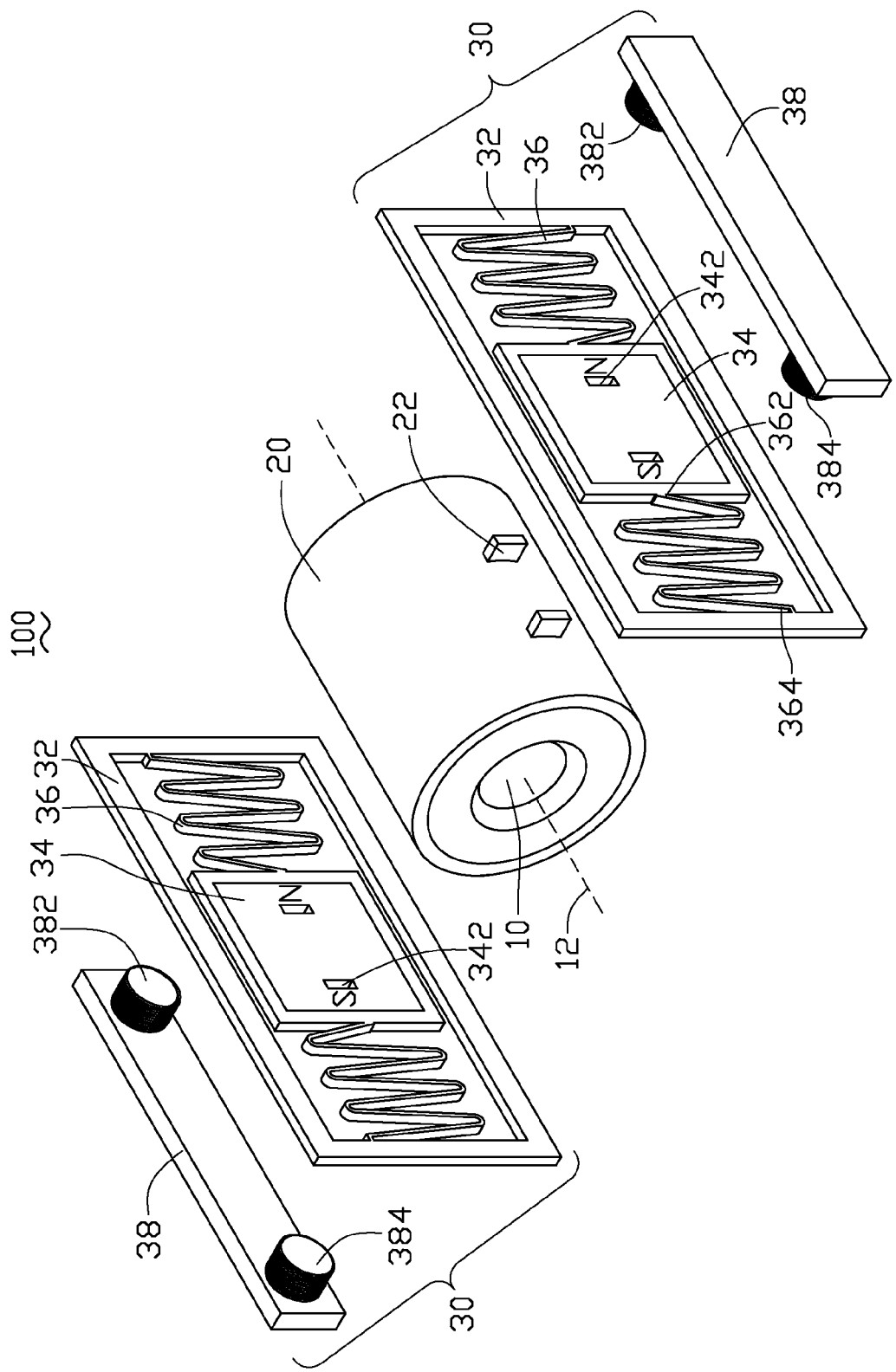
FIG. 1 is an exploded view of a lens module according to a preferred embodiment of the present invention.
Figure 2:
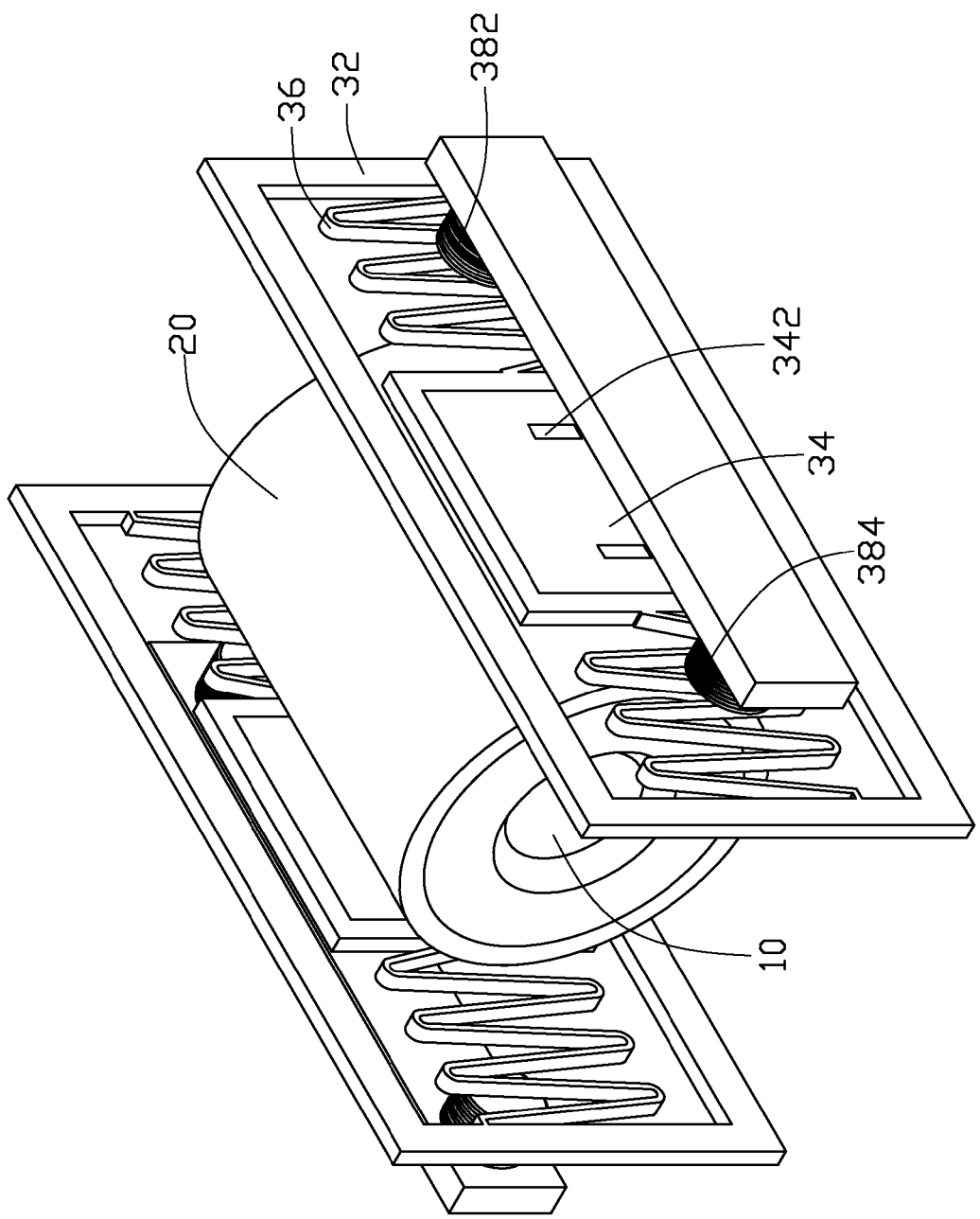
FIG. 2 is an assembled view of the lens module shown in FIG. 1.

Referring to FIGS. 1 and 2, an exemplary lens module 100 includes a lens barrel 20 having at least one lens 10 therein, and two lens barrel driving assemblies 30.

The at least one lens 10 is made of plastic or glass, and in a spherical or aspherical shape. The at least one lens 10 defines a principal optical axis 12 at a geometrical central axis thereof. The lens barrel 20 is cylindrical, and has a plurality of anchoring posts 22 on an outer wall thereof.

The two lens barrel driving assemblies 30 each include a frame 32, a magnetic block 34, two elastic members 36 and an electromagnetic driver 38. The frame 32 is a rectangular metal frame, and can be fixedly attached to a holder or a main body of an electronic device (not shown). The magnetic block 34 is a magnetized metal plate, which for example, can be made as this: first forming a NiFe (where Ni=nickel and Fe=iron) or ferroelectric material layer on the metal plate, then magnetizing the resulted metal plate in a strong magnetic field thereby forming permanent N, S (north, south) magnetic poles at two opposite sides of the metal plate. The magnetic block 34 has anchoring holes 342 thereon for engagingly receiving the anchoring posts 22 of the lens barrel 20 therein. The anchoring holes 342 can be blind holes or through holes. The two elastic members 36 each are a zigzag-shaped metal strip and have a first end 362 and an opposite second end 364. The first ends 362 of the two elastic members 36 are attached to the respective N, S magnetic poles of the magnetic block 34, and the second ends 364 thereof are secured to the frame 32 in a manner such that the magnetic block 34 is suspended and movable in the frame 32 in a magnetization direction of the N, S magnetic poles thereof.

It is understood that the frame 32, the metal plate of the magnetic block 34, and the two elastic members 36 can be formed integrally (i.e., as a single piece) using a metal stamping process.

The electromagnetic driver 38 includes first and second electromagnetic generators 382, 384. The first and second electromagnetic generators 382, 384 each have an iron core and a wire surrounding the iron core. The first and second electromagnetic generators 382, 384 are arranged adjacent to the frame 32 and at opposite sides of the magnetic block 34 and cooperatively configured for generating a magnetic field in a direction along the principal optical axis 12 of the at least one lens 10.

When electric currents in a first direction are supplied to the respective first and second electromagnetic generators 382, 384 of the two lens barrel assemblies 30, the first and second electromagnetic generators 382, 384 cooperatively generate a first magnetic field. A magnetic force of the first magnetic field is capable of driving the two magnetic block 34 jointly with the lens barrel 20 to move in a first direction of the principal optical axis 12 of the at least one lens 10. When electric currents in a second direction are supplied to the respective first and second electromagnetic generators 382, 384 of the two lens barrel assemblies 30, the first and second electromagnetic generators 382, 384 cooperatively generate a second magnetic field. A magnetic force of the second magnetic field is capable of driving the two magnetic block 34 jointly with the lens barrel 20 to move in an opposing second direction along the principal optical axis 12 of the at least one lens 10. In this way, the at least one lens 10 achieves an auto focus function.

Alternatively, the elastic members 36 can be coil springs.

It is understood that when the frame 32, the magnetic block 34, the elastic members 36 and the electromagnetic driver 38 each are cylindrical and are disposed around the lens barrel 20, only one lens barrel driving assembly is needed for the lens barrel 20.

The lens module 100 can be cooperated with an image sensor module (not shown) to become a camera module or to be used in varies of electronic devices.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module, comprising:
   at least one lens having a principal optical axis;
   a lens barrel receiving the at least one lens therein, the lens barrel having a plurality of anchoring posts on an outer wall thereof; and
   at least one lens barrel driving assembly comprising:
   a magnetic block having a plurality of anchoring holes engagingly receiving the anchoring posts of the lens barrel therein, with the lens barrel being fixedly attached to the magnetic block, the magnetic block being oriented in a manner such that a magnetization direction thereof is substantially parallel to the principal optical axis of the at least one lens;
   two elastic members each having a first end and an opposite second end, the first ends thereof being attached to opposite ends of the magnetic block;
   a frame receiving the elastic members and the magnetic block therein, the second ends of the elastic members being secured to the frame in a manner such that the magnetic block is suspended and movable in the frame in the magnetization direction thereof; and
   first and second magnetic generators arranged adjacent to the frame and at opposite sides of the magnetic block, the first and second magnetic generators being configured for generating a magnetic field for driving the magnetic block jointly with the lens barrel to move in a direction along the principal optical axis of the at least one lens.

2. The lens module as described in claim 1, wherein the at least one lens barrel driving assembly includes two lens barrel driving assemblies attached to opposite sides of the lens barrel.

3. The lens module as described in claim 1, wherein the magnetic block is a metal plate with a magnetic layer formed thereon.

4. The lens module as described in claim 1, wherein the elastic members are coil springs or a zigzag-shaped metal strip.

5. The lens module as described in claim 3, wherein the frame, the metal plate of the magnetic block, and the elastic members are formed integrally using a metal stamping process.

6. The lens module as described in claim 1, wherein the first ends of the two elastic members are directly attached to opposite ends of the magnetic block.

* * * * *